United States Patent [19]

Tuckey

[11] 3,782,354

[45] Jan. 1, 1974

[54] AUTOMATIC COMPRESSION RELIEF VALVE

[75] Inventor: Charles H. Tuckey, Cass City, Mich.

[73] Assignee: Walbro Corporation, Cass City, Mich.

[22] Filed: May 5, 1972

[21] Appl. No.: 250,682

[52] U.S. Cl. ............................... 123/182, 417/299
[51] Int. Cl. ...................... F01l 13/08, F04b 49/02
[58] Field of Search ..................... 123/182; 417/299

[56] References Cited
UNITED STATES PATENTS
3,335,711  8/1967  Roorda ............................. 123/182
3,417,740  12/1968  Perlewitz ......................... 123/182
FOREIGN PATENTS OR APPLICATIONS
801,282  12/1950  Germany ........................... 417/299

Primary Examiner—Al Lawrence Smith
Assistant Examiner—W. Rutledge, Jr.
Attorney—Arthur Raisch et al.

[57] ABSTRACT

An automatic compression relief valve which opens an engine cylinder to atmosphere for starting and closes in response to cylinder pressure under normal operating conditions. The relief valve includes a hollow body having a screw-end to fasten into a cylinder wall, a valve passage and seat at the cylinder end of the valve body leading to a vent in the body, a cup-like piston positioned in the body with the open end facing away from the cylinder and valve seat, and a valve projection at the valve seat end of the cup having a perforation to the inside of the cup so that pressure in the cylinder will move the cup against a spring bias to close the valve seat from the vent during engine operation.

4 Claims, 3 Drawing Figures

AUTOMATIC COMPRESSION RELIEF VALVE

This invention relates to an Automatic Compression Relief Valve for internal combustion engines to assist in the starting operation.

The purpose is to release pressure during starting and allow normal operation after the engine begins to fire. This general type of valve is shown in a U. S. Pat. to Roorda No. 3,335,711, dated Aug. 15, 1967 where a manually-operated valve is illustrated, and in a U. S. Pat. to Perlewitz No. 3,417,740, dated Dec. 24, 1968, where an automatic compression release is illustrated.

It is an object of the present invention to provide a very simple valve structure which can be applied to any engine without special construction by simply drilling and tapping a hole into the combustion chamber of a cylinder.

It is a further object to provide a device which will automatically shift to a vent position when the engine is stopped and which will automatically move to a vent closing position when pressure develops in the engine cylinder.

Other objects and features of the invention will be apparent in the following description and claims in which the best mode presently contemplated is set forth in connection with the drawings.

Figure 1:
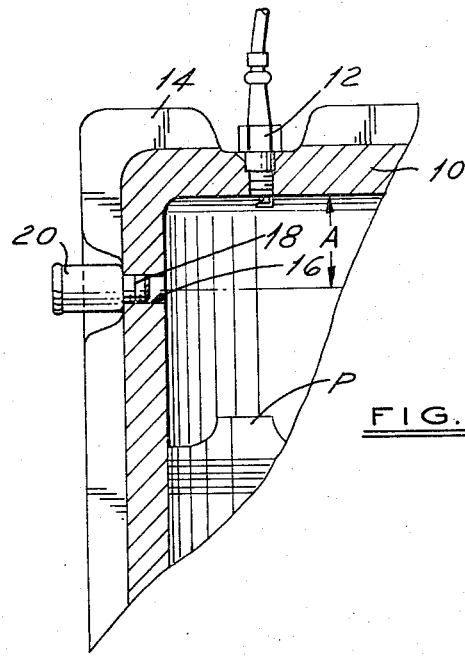

DRAWINGS accompany the disclosure and the various views thereof may be briefly described as:

FIG. 1, a sectional view of an engine cylinder showing the relief valve in position.

Figure 2:
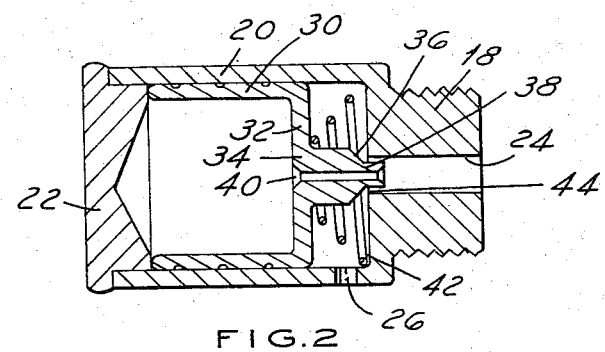

FIG. 2, a sectional view of the relief valve.

Figure 3:
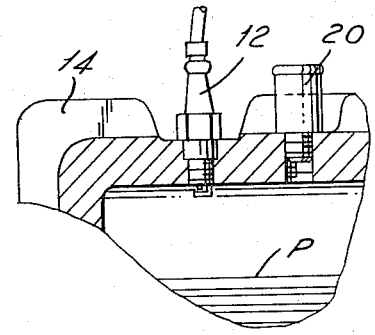

FIG. 3, a sectional view showing the relief valve in the cylinder head.

REFERRING TO THE DRAWINGS

In FIG. 1, an engine cylinder 10 is disclosed with the usual spark plug 12 and the cooling fins 14. A hole 16 is provided in the wall of the cylinder and this hole is tapped to receive a threaded end portion 18 of a small cylindrical housing 20. At the opposite end of the housing 20 from the threaded portion 18 is a sealing cap 22 which is suitably secured to the cylindrical chamber by threads or a press fit.

The extension 18 is provided with a passage 24 therethrough extending into the interior of the cylinder, and one wall of the cylinder is provided with an atmospheric opening 26 adjacent extension 18 which is open to the passage 24. Within the cylinder is a cup-like piston 30 having a bottom wall 32 carrying a small coaxial projection 34 which reduced at a portion 36 to a smaller dimension 38. The projection 34 is provided with a central opening 40 which connects the interior of the cup piston 30 and the cylinder 20 to the passage 24. A coil spring 42 between one end of the cylinder 20 and the bottom of the piston serves to bias the piston to the left as shown in FIG. 2.

The projection 34 with the ensmalled extension 38 is sufficiently long that the extension 38 lies in the passage 24 leaving an annular opening 44 from the passage to the interior of the cylinder chamber. Thus, the exposed opening of the passage 40 is closer to the engine end of passage 24 than the annular opening 44 and it also lies within the passage 24 at all times. The reduced portion 36 will seat against the periphery of the passage 24 to provide a valve and seat relationship and will also limit the outward motion of the piston so that opening 26 is never blocked.

The seal between the piston 30 and the inside diameter of the cylinder 20 can either be by a close sliding fit or a resilient seal which will permit the necessary sliding action to take place. It will be noted that the dimension A is such that the distance between the opening 16 and the top of the cylinder will permit the piston P to close this opening as it moves to the top of its stroke, thus insuring that a firing compression can develop.

In the operation of the device, when the vent opening 26 is connected to the passage 24, the turning over of the engine will be relatively easy. This permits a fast cranking action and thus facilitates starting. As soon as pressure develops in the top of the cylinder, it will be transmitted through the passage 24 and the opening 40 to the back side of the piston 30 so that the piston will move against the spring 42 and close the valve seat opening around the projection 38, thus closing off the vent opening 26.

As shown in FIG. 3, it is possible also to mount the relief valve in the cylinder head. In this position, there will be no cut-off by the piston but the valve can be effective in this position as well. Thus, when reference is made to the cylinder wall, this can mean the cylinder head as well as the side wall.

It will be appreciated by those skilled in the art of engine design that various engines might utilize different dimensions relative to the size of the opening 40 and the size of the annular opening 44. In general, for small engines, it is recommended that the orifice opening 40 be about 0.020 to 0.030 inch. The reason, of course, for the small opening is that it will delay the closing of the valve so that the engine may be turned over sufficiently to create firing compression for starting and it will also prevent the opening of the valve during engine operation due to fluctuations of engine pressure in the cylinder.

The annular opening 44 is calibrated relative to the vent opening 26 so that there will be no build-up of pressure in front of the valve piston 30. The size of the annular opening 44 in addition to being related to the vent 26 will also be calibrated to a particular engine to permit some pressure build-up so that the engine will fire. Since there are many different engines which vary in size, stroke, and compression ratio, it is important that the particular relief valve be designed for a particular engine on the basis of the principles above described relative to operation.

I claim:

1. A relief vent control means for internal combustion engines for the reduction of compression pressure to reduce torque requirements for engine turn-over during starting which comprises:
   a. a valve body having an inner end portion to mount in a wall of an engine cylinder, said body having a cylindrical chamber closed at the outer end,
   b. a passage formed at the inner end portion leading to the interior of an engine cylinder and an atmospheric vent opening formed in the wall of said chamber spaced from said passage,
   c. means forming a valve seat at the chamber end of said passage,
   d. a piston having a sliding fit in said chamber formed as a cup with the open end of the cup facing away from said valve seat and dimensioned to move axially in said chamber, e. means in the bottom of said cup engageable with said valve seat to close said seat in one position of said piston, f. an orifice formed in said cup bottom exposed to said passage and open to the interior of said cup, and g. means biasing said cup away from said seat, said orifice serving to admit pressure from said passage to the interior of said cup to cause said cup to move against said bias to close said passage and block said passage from said vent opening.

2. A relief vent control means for internal combustion engines as defined in claim 1 in which the means on the bottom of said cup comprises a perforate projection having a tip portion within and concentric to said passage and a portion movable into contact with said seat to close said passage from said vent.

3. A relief vent control means for internal combustion engines as defined in claim 1 in which the means on the bottom of the cup comprises a projection having an ensmalled tip portion within and concentric to said passage and a concentric larger portion movable into engagement with said seat upon shifting of said cup toward said passage to close said passage from said vent.

4. A relief vent control means for internal combustion engines to relieve compression during starting turnover which comprises:

a. first chamber means mountable in an engine cylinder wall in communication with the interior of the cylinder and having a cylindrical chamber extending away from the engine cylinder with an atmospheric vent in the chamber positioned relatively close to said engine cylinder, b. a piston movable in and exposed to said cylindrical chamber having means to close said vent from the interior of said engine cylinder when in the first of two positions, c. means biasing the piston to a second position in which said vent is open, and d. means forming a restricted passage to connect the interior of said chamber on the side of the piston opposite the engine cylinder to the interior of the engine cylinder on which said chamber means is mounted whereby firing pressure in the engine cylinder will develop pressure in said chamber and move said piston to said first position.

* * * * *